US012106139B2

United States Patent
Anand et al.

(10) Patent No.: US 12,106,139 B2
(45) Date of Patent: Oct. 1, 2024

(54) SELF ORCHESTRATED CONTAINERS FOR CLOUD COMPUTING

(71) Applicant: INTERNATIONAL BUSINESS MACHINES CORPORATION, Armonk, NY (US)

(72) Inventors: Vishal Anand, Dublin (IE); John Paul Easton, Bradley (GB); Sham Vaidya, Detroit, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 623 days.

(21) Appl. No.: 17/357,364

(22) Filed: Jun. 24, 2021

(65) Prior Publication Data

US 2022/0413894 A1 Dec. 29, 2022

(51) Int. Cl.
*G06F 9/46* (2006.01)
*G06F 9/50* (2006.01)

(52) U.S. Cl.
CPC ............ *G06F 9/465* (2013.01); *G06F 9/5016* (2013.01)

(58) Field of Classification Search
CPC ............................... G06F 9/465; G06F 9/5016
See application file for complete search history.

(56) References Cited

U.S. PATENT DOCUMENTS 10,318,335 B1  6/2019  Toy
11,055,273 B1*  7/2021  Meduri ............... G06F 16/2358

2018/0097845 A1  4/2018  Chen et al.
2020/0050494 A1  2/2020  Bartfai-Walcott et al.
2021/0019055 A1  1/2021  Bett et al.
(Continued)

FOREIGN PATENT DOCUMENTS

CN     105933448 A    9/2016
CN     109067564 A   12/2018
WO    2006113434 A2  10/2006

OTHER PUBLICATIONS

International Search Report issued in corresponding PCT Application Serial No. PCT/CN2022/100040 issued on Sep. 7, 2022, pp. 1-9.

(Continued)

*Primary Examiner* — Tammy E Lee
(74) *Attorney, Agent, or Firm* — Tutunjian & Bitetto, P.C.; Michael A. Petrocelli (57) ABSTRACT

A plurality of containers can be configured for running applications associated to at least one node of a distributed computing environments. The containers of the plurality of containers includes integrated intelligence that provides an in memory state component that detects how container instances are running. A quorum synchronization component of the integrated intelligence can coordinate the activities of the containers. A first container can be initiated for running a first node application. The memory state component can determine if a topology exists in the plurality of containers that is running an existing application matching the first node application. The quorum synchronization component of the integrated intelligence can coordinate running of the first node application with the first container with the existing application.

20 Claims, 7 Drawing Sheets

(56) References Cited

U.S. PATENT DOCUMENTS

2021/0028977 A1 1/2021 Ortenberg et al.
2021/0048995 A1* 2/2021 Myers .................. G06F 8/60

OTHER PUBLICATIONS

Mell, Peter, et al., "The NIST Definition of Cloud Computing," Sep. 2011, 7 pages.
Deo, Nilesh, "Best Container Orchestration Tools for 2020," https://www.cloudbolt.io/blog/best-container-orchestration-tools-2020/, Apr. 2021, 8 pages.
Ravindra, Savaram, "Kubernetes vs. Docker Swarm: What's the Difference?" TheNewStack, https://thenewstack.io/kubernetes-vs-docker-swarm-whats-the-difference/, Sep. 2018, 15 pages.
Thiry, Daniel, "Kubernetes: Advantages and Disadvantages—The Business Perspective," DevSpace, https://devspace.cloud/blog/2019/10/31/advantages-and-disadvantages-of-kubernetes, Oct. 2019, 7 pages.
Qazi, Asfand, et al., "What are some major drawbacks of Docker and Kubernetes?" Quora, https://www.quora.com/What-are-some-major-drawbacks-of-Docker-and-Kubernetes, Apr. 2021, 5 pages.
Eldridge, Isaac, "What Is Container Orchestration?" New Relic, https://blog.newrelic.com/engineering/container-orchestration-explained/, Jul. 2018, 10 pages.
Taylor, Kelsey, "What are the Pros and Cons of Using Kubernetes?" https://www.hitechnectar.com/blogs/pros-cons-kubernetes/#ConsofusingKubernetes, Apr. 2021, 4 pages.
Rossi, Fabiana, "Self-management of containers deployment in decentralized environments," 2019 IEEE World Congress on Services (Services), IEEE, Jul. 2019, pp. 315-318, 2642.
Anoyomous, "Best Container Orchestration Software," https://www.g2.com/categories/container-orchestration, Jun. 2021, 13 pages.
Anoyomous, "KubeEdge v1.4 is live!" https://kubeedge.io/en/, Jun. 2021, 4 pages.
Anoyomous, "Production-Grade Container Orchestration," https://kubernetes.io/, Jun. 2021, 6 pages.

\* cited by examiner

SELF ORCHESTRATED CONTAINERS FOR CLOUD COMPUTING

BACKGROUND

The present invention generally relates to managing distributed computing, and more particularly to running applications in multiple clusters of the distributed computing system.

Kubernetes is a portable, extensible, open-source platform for managing containerized workloads and services, that facilitates both declarative configuration and automation. Kubernetes is an example of a distributed system. It treats all the machines in a cluster as a single pool of resources. It takes up the role of a distributed operating system by effectively managing the scheduling, allocating the resources, monitoring the health of the infrastructure, and even maintaining the desired state of infrastructure and workloads. Kubernetes is an operating system capable of running modem applications across multiple clusters and infrastructures on cloud services and private data center environments. Kubernetes include two layers including of the head nodes and worker nodes. The head nodes typically run the control plane responsible for scheduling and managing the life cycle of workloads. The worker nodes act as the workhorses that run applications. The collection of head nodes and worker nodes becomes a cluster. However, the components of Kubernetes, which can include a controller and scheduler, contribute to complexity that can limit their productivity.

SUMMARY

In accordance with an embodiment of the present invention, a method of employing self-orchestrating containers in a distributed network is provided. The computer-implemented method may include configuring a plurality of containers for running applications associated to at least one node of a distributed computing environments, wherein the containers of the plurality of containers includes integrated intelligence that provides an in memory state component that detects how container instances are running, and where a quorum synchronization component that coordinates the activities of the containers. The computer implemented method may further include initiating a first container from the plurality of containers for running a first node application on at least one node of the distributed network. In some embodiments, the method can employ the in memory state component of the integrated intelligence from the plurality of containers to determine a topology existing in the plurality of containers that is running an application matching the first node application at an existing node of the distributed network separate from the node at which the first node application is to be run. In some embodiments, the method can employ the quorum synchronization component of the integrated intelligence from the plurality of the containers to coordinate running of the first node application with the first container with the application running at the existing node of the distributed network.

In another embodiment, a system for self-orchestrating containers is provided that includes a hardware processor; and a memory that stores a computer program product. The computer program product when executed by the hardware processor, causes the hardware processor to configure a plurality of containers for running applications associated to at least one node of a distributed computing environments, wherein the containers of the plurality of containers includes integrated intelligence. The integrated intelligences provides an in memory state component that detects how container instances are running, and where a quorum synchronization component that coordinates the activities of the containers. The computer program product when executed by the hardware process can also initiate a first container from the plurality of containers for running a first node application on at least one node of the distributed network. The computer program product when executed by the hardware process can also employ the in memory state component of the integrated intelligence from the plurality of containers to determine a topology existing in the plurality of containers that is running an application matching the first node application at an existing node of the distributed network separate from the node at which the first node application is to be run. The computer program product when executed by the hardware process can also employ the quorum synchronization component of the integrated intelligence from the plurality of the containers to coordinate running of the first node application with the first container with the application running at the existing node of the distributed network.

In yet another embodiment, a computer program product is provided for self-orchestrating containers in distributed computing environments. The computer program product may include a computer readable storage medium. The computer readable storage medium may have computer readable program code embodied therewith, the program instructions executable by a processor to cause the processor to configure, using the processor, a plurality of containers for running applications associated to at least one node of a distributed computing environments, wherein the containers of the plurality of containers includes integrated intelligence that provides an in memory state component that detects how container instances are running. The integrated intelligence can also include a quorum synchronization component that coordinates the activities of the containers. The program instructions can also initiated, using the processor, a first container from the plurality of containers for running a first node application on at least one node of the distributed network. The program instructions can also employ, using the processor, the in memory state component of the integrated intelligence from the plurality of containers to determine a topology existing in the plurality of containers that is running an application matching the first node application at an existing node of the distributed network separate from the node at which the first node application is to be run. The program instructions can also employ the quorum synchronization component of the integrated intelligence from the plurality of the containers to coordinate running of the first node application with the first container with the application running at the existing node of the distributed network.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The methods, systems and computer program products described herein are directed to self-orchestrated containers for managing applications in distributed computing environments, such as cloud computing environments.

Kubernetes is a portable, extensible, open-source platform for managing containerized workloads and services, that facilitates both declarative configuration and automation. However, the components of Kubernetes, which can include a controller and scheduler, contribute to complexity that can limit their productivity. The control plane runs the Kubernetes components that provide the core functionalities: exposing the Kubernetes API, scheduling the deployments of workloads, managing the cluster, and directing communications across the entire system. The head monitors the containers running in each node as well as the health of all the registered nodes. Container images, which act as the deployable artifacts, must be available to the Kubernetes cluster through a private or public image registry. The nodes that are responsible for scheduling and running the applications access the images from the registry via the container runtime. The scheduler selects the node on which each workload should run based on its assessment of resource availability, and then tracks resource utilization to ensure the pod isn't exceeding its allocation. It maintains and tracks resource requirements, resource availability, and a variety of other user-provided constraints and policy directives; for example, quality of service (QoS), affinity/anti-affinity requirements and data locality. An operations team may define the resource model declaratively. The scheduler interprets these declarations as instructions for provisioning and allocating the right set of resources to each workload. The part of Kubernetes' architecture which gives it its versatility is the controller-manager, which is a part of the head. The controller-manager's responsibility is to ensure that the cluster maintains the desired state of application all the time through a well-defined controller. A controller is a control loop that watches the shared state of the cluster through the API server and makes changes attempting to move the current state towards the desired state. The controller maintains the stable state of nodes and pods, by constantly monitoring the health of the cluster and the workloads deployed on that cluster. For example, when a node becomes unhealthy, the pods running on that node may become inaccessible. In such a case, it's the job of the controller to schedule the same number of new pods in a different node. This activity ensures that the cluster is maintaining the expected state at any given point of time.

However, it has been determined that Kubernetes can be excessive for simpler applications or when running smaller numbers of applications. The complexity of the above described controllers and scheduler can reduce productivity. Additionally, transitioning to Kubernetes can be costly and cumbersome.

The methods, systems and computer program products that are described herein provide self-orchestrated containers that can be used in distributed computing environments, such as cloud computing, to manage applications across multiple clusters. In some embodiments, the methods, systems and computer program products employ containers having integrated intelligent functionalities for making decisions rather than going to external third party applications for making application management decisions. The containers include topology based container membership and state definitions. The containers include an in-memory state for all running containers on each node. The intelligence provides that each running container has its own state. Stage change of containers trigger updates in memory state. The container intelligence provides that when there is any change in topology, e.g., the containers fail or a node fails, then the other running state containers fail or node fails, then the other running state containers on other nodes (during node failure) agree who does what from the in-memory state and from the last known state. In some instances, a predefined behavior of a container decides the to be state, i.e., future state, within the topology. In some embodiments, a scaler container within the topology decides the scaling of all containers running the application components depending upon the load, traffic and application requests within the topology. Additionally, the integrated intelligence within the container provides flexibility to the users, e.g., developers, to provide additional functionalities, such as control and workflows of the applications in the distributed network. The methods, systems and computer program products that provide for using visual artefacts including pictograms to search source code are now described with greater detail with reference to FIGS. 1-7.

Figure 1:
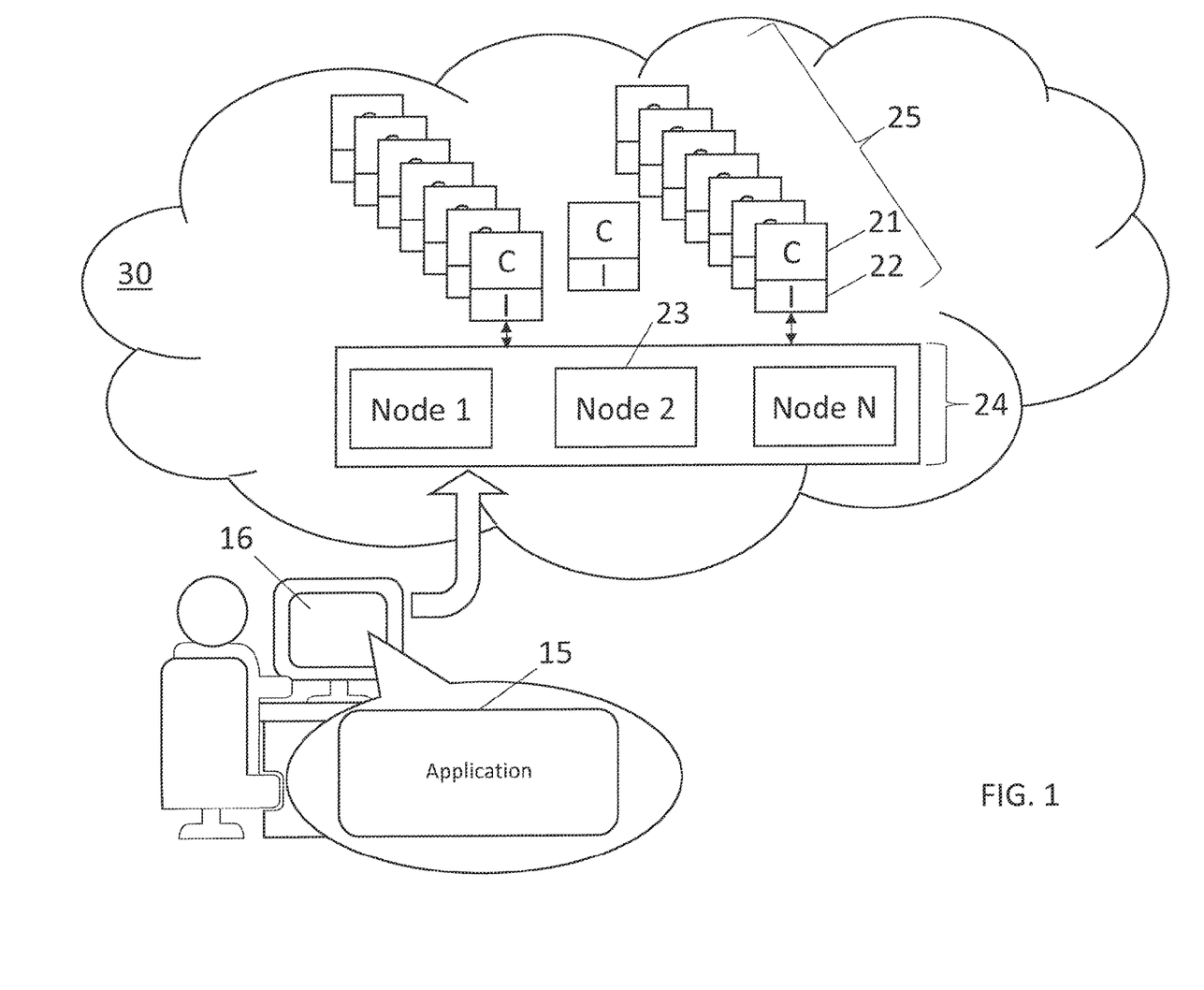
FIG. 1 is a diagram illustrating an exemplary environment, where self-orchestrated containers are controlling applications for distributed computing, such as cloud computing, in accordance with one embodiment of the present disclosure.
Figure 2:
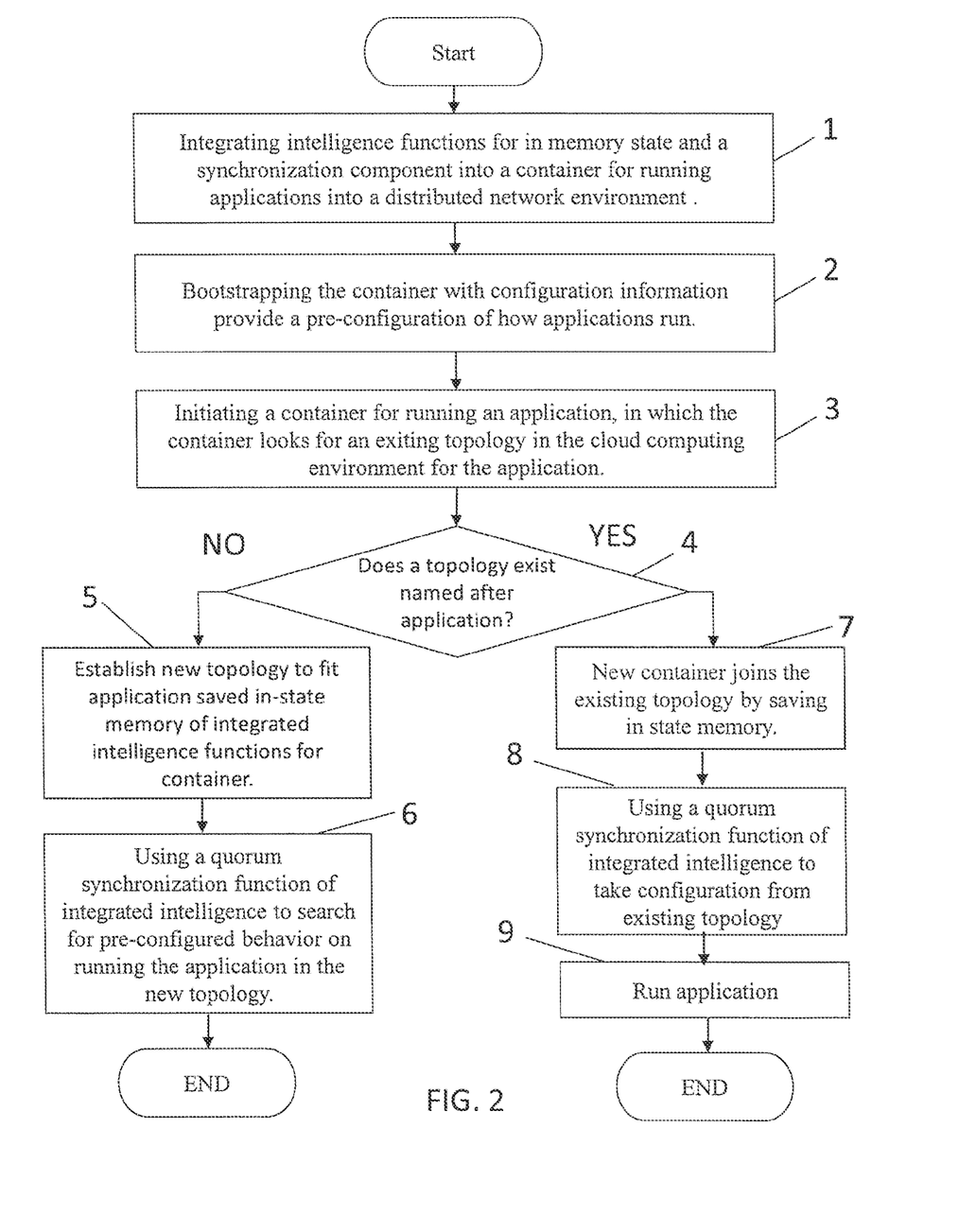
FIG. 2 is a flow chart/block diagram illustrating a method that employs self-orchestrated containers for managing applications in distributed computing, in accordance with one embodiment of the present disclosure.
Figure 3:
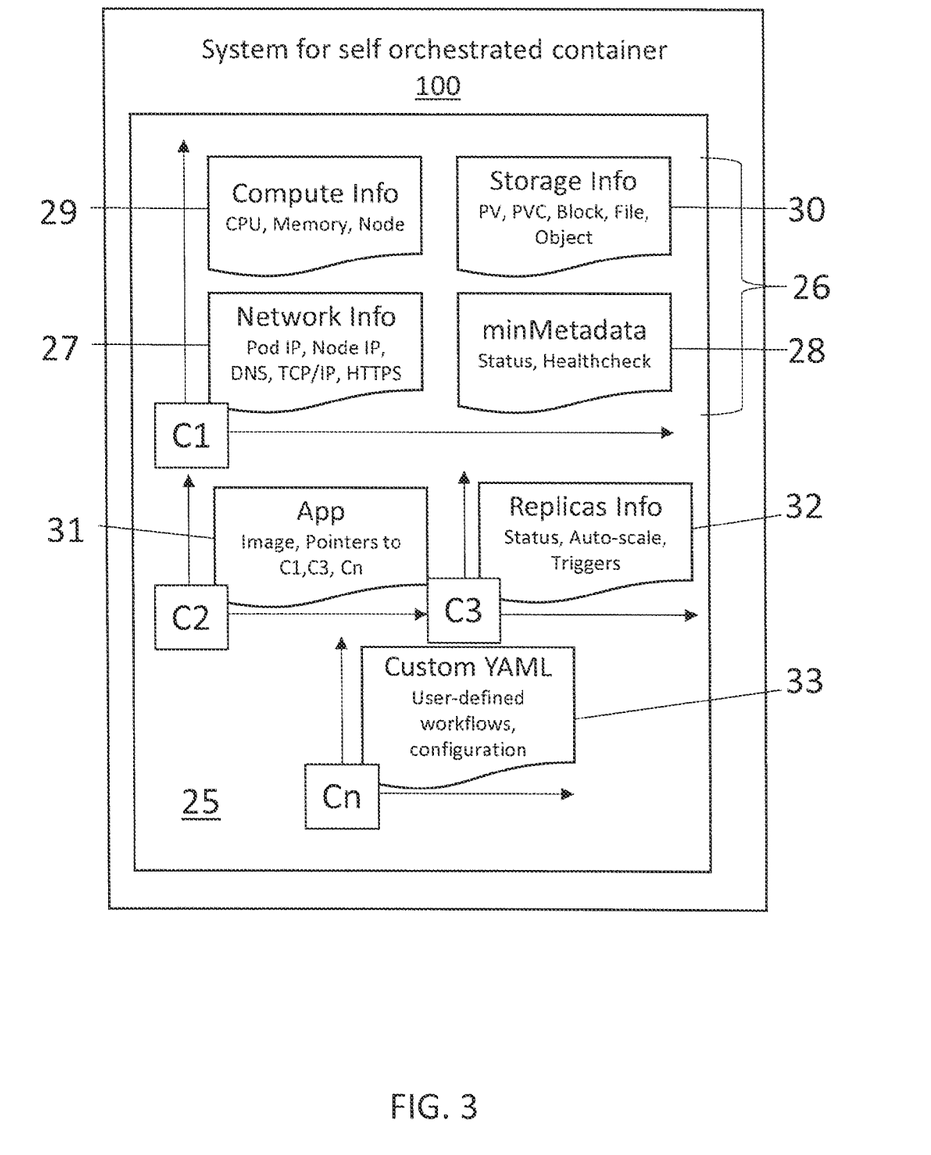
FIG. 3 is a block diagram illustrating a system that employs self-orchestrated containers, in accordance with one embodiment of the present disclosure.

FIG. 1 depicts one embodiment of an exemplary environment, in which a self-orchestrated container 21 is provided for controlling applications 15 for distributed computing, such as cloud computing environment 30. FIG. 2 is a flow chart/block diagram illustrating one embodiment of a method that employs self-orchestrated containers 21 for managing applications 15 in distributed computing. FIG. 3 is one embodiment of a system that employs self-orchestrated containers, which may be used with the method depicted in FIG. 2.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The self-orchestrated containers 21 described herein eliminate the need for Kubernetes. In some embodiments, there are two intelligent functions that are integrated into the containers 21 used in the methods and systems of the present disclosure. The two intelligent functions that are integrated into the containers provide the integrated intelligence 22 that is used to manage applications across the different nodes.

One intelligent function is to provide an "in-memory state/membership mechanism" component that understands how many container instances are running, and where and what the state for bootstrapping, last good state. In general, "bootstrapping" usually refers to a self-starting process that is supposed to continue or grow without external input. Bootstrapping describes a process that automatically loads and executes commands. The second intelligent function is to provide a "quorum/voting/synchronization" component allows these containers to coordinate their activities.

In one embodiment, a method is provided for running an application in a distributed computing environment, e.g., cloud computing environment, using containers having integrated intelligence.

FIG. 1 depicts one embodiment of an exemplary environment, in which a self-orchestrated container 21 is provided for controlling applications 15 for distributed computing, such as cloud computing environment 30. The self-orchestrated containers 21 include integrated intelligence 22. Nodes 23, e.g., Node 1, Node 2 and Node N, and clusters 24 are the hardware that carries the application 15 deployments in a cloud environment 30. A node 23 can be a server. Nodes 23 store and process data. Nodes 23 can be a physical computer or a virtual machine (VMs). VMs are software programs in the cloud that allow you to emulate a physical computing environment with its own operating system (OS) and applications. A cluster 24 is a group of servers or nodes. A cluster 24 can include a master node, which is a unified endpoint within the cluster, and at least two worker nodes. All of these nodes 23 communicate with each other through a shared network to perform operations. In essence, you can consider them to be a single system.

Applications run on top of a cluster. Containers 21 are a self-contained environment for applications. Containers 21 allow you to package application code separately from the infrastructure it runs on the nodes 23 and clusters 24. This provides the ability to run an application on any computer that uses a containerization platform. It's not tied to a specific node or cluster.

A pod 25 is a higher-level structure that wraps around one or more containers 21. It represents the processes running in on a cluster 24 of virtual machines (nodes). It's a group of containers 21 deployed on the same host with shared resources, including memory and storage capacity. Pods 25 are deployed on nodes 23 within a cluster 24. In some embodiments, nodes 23 collect these pods 25, each of which has a single IP address that's applied to every container 21 wrapped inside of it. Deployments are based on the number of pod replicas needed and launch the application on top of the cluster 24.

For example, if an application is popular but only running in a single container instance, that instance might not be able to support the demand. When this happens, the methods, systems and computer program products of the present disclosure can deploy more copies of the pod 25 where the container 21 is located to the cluster 24 (or nodes 23) as needed. The management of that process is provided by the intelligence 22 integrated into the container 21.

Referring to FIG. 2, the method may begin with integrating intelligence functions 22 for in memory state and a synchronization component into a container 21 for running applications into a distributed network environment at block 1. The method depicted in FIG. 2 can run applications for multiple clusters without using Kubernetes.

Referring to block 2, the method may continue with "bootstrapping" the container 21 with configuration information. In one embodiment, the configuration information may include internet protocol (IP) addresses/network information. In some embodiments, the name of the application being run through the container is also part of the configuration information. Further, the number of instances for running the application is also included in the configuration information that would be considered for normal operation. Additional configuration information, may be included to scale the application, as well as more aspects that would be needed to make the application run. The configuration information may also include information of how to handle inconsistencies that may occur during running the application. For example, the configuration information may include information on how the containers 21 should handle what to happen when the application is not running as normal. This may be considered as a pre-configured behavior of how the containers 21 should run the application when inconsistencies can occur. This pre-configured behavior may be running dormant. The configuration information may be recorded in the container 21 using a configuration file, i.e., config file, or via command line parameters.

Referring to block 3 of the method depicted in FIG. 2, a first container may be initiated. The first container looks for an existing topology named after the application at block 4. The container may include the topology having the named application from the bootstrapping step described with reference to block 2.

If a topology named after the application is not available at block 4, the method may continue with establishing a new topology to fit the application at block 5. A topology is created having an initial in memory state. The initial in memory state may be provided by the in memory state/membership mechanisms of the intelligence 22 that is integrated into the container 21.

Still referring to FIG. 2, when a topology does not exist at the time of the initiation of the first container, and an initial in memory state is created at block 4, the method may continue with starting the quorum/voting/synchronization capability of the integral intelligence 22 within the container 21. Block 6 includes using the quorum/voting/synchronization capability of the integral intelligence 22 within the container 21 to look for behavior to know how to proceed. For example, the quorum/voting/synchronization capability of the integral intelligence 22 within the container 21 can look to the configuration information. The configuration information may also include information of how to scale up the applications and how to handle inconsistencies that may occur during running the application. This may be considered as a pre-configured behavior of how the containers 21 should run the application. For example, the pre-configured behavior may indicate whether the application should be run or remain dormant until further instruction. In some instances the application is run from the container 21 at block 5.

In some examples, a second container may be started. In this example, the method may go back to block 3. Referring to block 3 of the method depicted in FIG. 2, the second container looks for an existing topology named after the application at block 4. In this example, the second container may include the topology having the named application from the bootstrapping step described with reference to block 2. Taking this scenario, in which the first container has already been formed, as described above with reference to blocks 4, 5 and 6, when the second container looks for an existing topology at block 4, the second container may find the topology of the first container for the named applications. In this example, the second container may join the existing topology of the first container at block 8.

Referring to block 8, the second container starts the quorum/voting/synchronization capability and synchronizes its in-memory state with that from the previously started containers. The second container looks to the behavior of the existing containers to determine what actions to take. In some embodiments, the quorum voting/sync capability in the first and second container agree what the container needs to do to meet the requirements of the application running thereon. The second container may then run the application meeting those requirements at block 9.

Figure 4:
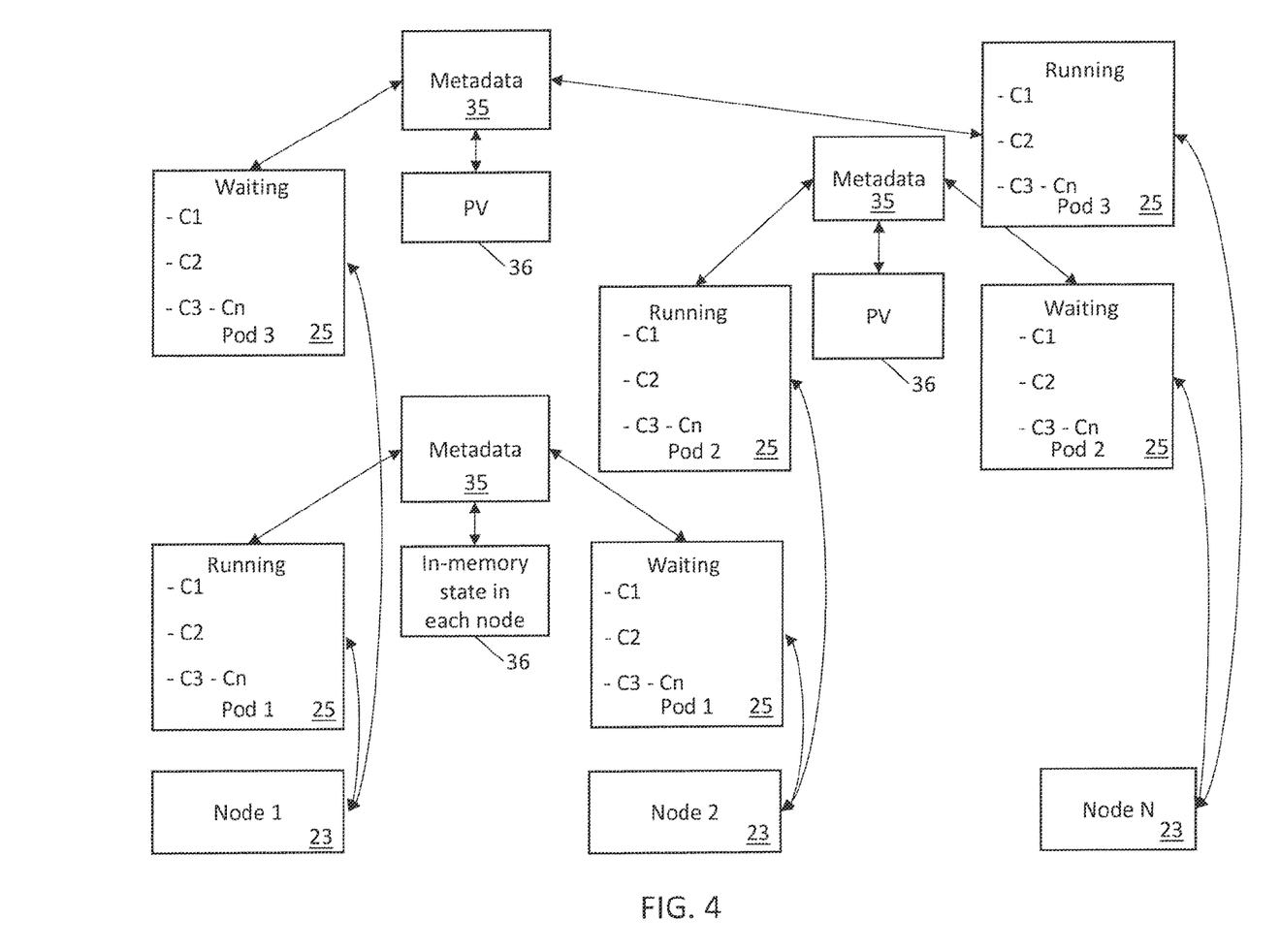
FIG. 4 is an illustration of a self-orchestrating containers managing applications across a plurality of nodes in a cloud computing environment, in accordance with one embodiment of the present disclosure.

In some embodiments, the self-orchestrating containers 21 have the ability to share meta data, as illustrated in FIG. 4. The meta data being shared between the different containers 21, e.g., pods 25 of containers 21, allows for the containers to know the state of the containers relative to running applications. The meta data also allows for the different containers to update the in-state memory. The containers include the in-memory state for all running containers on each node. The intelligence provides that each running container has its own state. Stage change of containers trigger updates through the in memory state. The container intelligence provides that when there is any change in topology, e.g., the containers fail or a node fails, then the other running state containers fail or node fails, then the other running state containers on other nodes (during node failure) agree which node does what in running the application from the in-memory state and from the last known state. For example, the "in-memory state/membership mechanism" component of the intelligence integrated into the containers understands how many container instances are running, and where and what the state for bootstrapping, last good state. In general, "bootstrapping" usually refers to a self-starting process that is supposed to continue or grow without external input. Bootstrapping describes a process that automatically loads and executes commands. The second intelligent function is to provide a "quorum/voting/synchronization" component allows these containers to coordinate their activities.

In some embodiments, the methods provide for redistributing the running of applications when a container fails. In one example, the cloud computing environment may include two containers. One container may be active, while the second container may be dormant. In this example, additional containers may start. When the additional containers start, they look for existing topology, and synchronize their in memory states. Additionally, when the new containers start, they take on their allocated roles from the behavior of the other containers.

In one example, the second container (container 2) fails. The surviving container(s) look to the behavior of the remaining containers, and use the quorum/voting/synchronization capability of the integrated intelligence of the containers to determine what the remaining containers need to do turn the application, while compensating for the failure of the second container. For example, in some embodiments that include two containers, the second container may of originally been a passive backup for the first container. In another example, using three containers, in response to the second container failing, the new container, e.g., third container, will now become the passive backup for the first container.

In another example of the same fact scenario in which the cloud computing environment include two containers, when the first container fails, the surviving container(s) look at the behavior from in-memory state and use the voting/synchronization capability to determine what each container needs. In this example, the third container becomes live and starts the application.

In the instances, in which the first container rejoins, the first container will use the quorum/voting/synchronization capability to synchronize its in memory state and reviews the behavior of the remaining containers to determine how to run the application. One possible option may include the first container rejoining as a backup. Another possible option is that the first container takes the application back to run. In this example, the case voting/synchronization is used to coordinate shutdown of the application wherever it is running, and to restart the application in the first container.

In some embodiments, the in-memory state of the containers provides for maintenance at each container and at each pod in each node. There can be multiple copies of in memory states disbursed across the nodes. For example, if one state is running, each of the node will be bootstrapped with the same original state or last known good state. In some embodiments, a quorum of in-memory states means that a second or third is required in more than two nodes. In a two node split scenario, the behavior follows the primary leaders which was bootstrapped successfully.

In some embodiments, the in memory state of the containers may include application programming interface (API) applications. In some embodiments, the in-memory state of the containers include an application for YAML. YAML is a configuration file that is intended to contain public information about clouds that are common across a large number of users. The idea is that clouds-public. YAML can be shared among users to simplify public cloud configuration.

FIG. 3 is a block diagram illustrating a system 100 that employs self-orchestrated containers. In one embodiment, the system 100 that is depicted in FIG. 3 is a pod 25 of containers 21 for running an application. The containers have an integrated intelligence. The pod 25 includes a plurality of containers 21. In one embodiment, the pod 25 includes a starter container (C1) 26, an application container (C2) 31, a scaler container (C3) 32 and a custom container (Cn) 33.

In one embodiment, the starter container 26 may include information relating to the computer, storage, network and maintains a mini metadata in itself, which is responsible for watching the state of the application. The starter container 26 provides one element of the integral intelligence for the container that allows the container, e.g., pod including the starter container 26, to be self-orchestrated. The starter container 26 contributes to the "in-memory state/membership mechanism" component of the intelligence integrated into the containers.

The start container 26 can also trigger appropriate action in the container for running the application in the application container 31. The start container 26 can also restore the state of the application in a desired state. This is responsible for the membership mechanism/topology and will start the second container, i.e., application container 31. The start container may include memory including the network information, e.g., a network module 27 of the start container 26. The network information stored in the network module 27 may include the pod IP address, the node IP address, the domain name system (DNS) information, the TCP/IP address and the HTTPS address.

The start container 26 may also include memory for minMetadata information, e.g., minMetadata information module 28. The minMetadata information module can include information for checking the status and healthcheck for an application running on the container, i.e., pod 25 of containers. The start container 26 can also include memory for computer information, i.e., computer info module 29. The computer info module 29 can contain information such as the CPU, memory and other infrastructure information at the nodes. In some embodiments, the start container 26 can further include memory for storage information, e.g., a storage info module 30. The storage info module 30 can include persistent volume (PV), and persistent volume claim (PVC) information. Persistent volume (PV) is the allocated storage, and persistent volume claim (PVC) is the request to use that storage. The storage info module 30 may also contain information on whether the storage type is block, file or object storage.

The second container, e.g., application container 31, contains the application image and pointers to the other containers within the same pod 25 which determines where and how the application container should run. Each application container 31 can function as a master.

The third container, e.g., replica info container 32, is a container that keeps the information about how many replicas are needed or running, how many are healthy or dormant, how many should be scaled up or down depending upon the trigger from the second container, e.g., application container 31, based on the load.

The fourth container, e.g., customization container 33, can provide for flexibility to the users, e.g., developers, to inject custom workflows or configurations to change and maintain the behavior and interactions of other containers, e.g., the start container 26, the application container 31, and the replica info container 32, within the same pod 25.

In some embodiments, the container configuration depicted in FIG. 3 can be pluggable with the existing Kubernetes based software. For example, the container configure depicted in FIG. 3 may be integrated into the vulnerability scanner, security tools, SDN, SDS, Registry, API, as well as all the configurations based on YAML.

In some embodiments, a minimum of one dormant state pod is present on each node (where no pod is already in a running state). The pod that is maintained in the dormant state may perform only listening and probing task to the running pods to maintain the major metadata (majMetadata) on the configured ports.

FIG. 4 illustrates a plurality of nodes 23, e.g., node 1, node 2 and node n. In the example depicted in FIG. 4, each node 23 has associated pods 25 of containers. The containers are illustrated by "C1", "C2", "C3" and Cn. C1 has been described with reference to FIG. 3 as the starter container 26. C2 has been described with reference to FIG. 3 as the application container 31. C3 has been described with reference to FIG. 3 as the scaler container 32. Cn has been described with reference to FIG. 3 as the custom container (Cn) 33.

Referring to FIG. 4, in one embodiment, the first node (node 1) includes a running pod (pod 1), e.g., a pod of containers running an application, and a waiting pod (pod 2), e.g., a pod of containers in which an application is running dormant or an application has not yet been assigned. The second node (node 2) may include a waiting pod (pod 1), e.g., a pod of containers running an application, and a waiting pod (pod 2), e.g., a pod of containers in which an application is running dormant or an application has not yet been assigned. Comparing the first and second nodes illustrates the running pod and the waiting pod share metadata 35. The meta data 35 includes the in-memory state 36 of each node 23. The metadata facilitates that the application running on pod 1 of node 1 may be run on pod 1 of node 2. In some examples, the application running on pod 1 may be replicated on pod 1 for the purposes of scaling up. In other examples, pod 1 may fail. When pod 1 on node 1 fails, the application may be started on pod 1 of node 2. The metadata provides the information for pod 1 on node 2 to replicate the application.

Still referring to FIG. 4, on the first node (node 1), the third pod (pod 3) may be in a state of waiting; while the third pod (pod 3) on the third node (node N) may be running an application. Similar to the preceding described example references FIG. 4, metadata 35 may be shared between the third pod (pod3) on the first node, and the third pod (pod3) on the third node (node N). The metadata 35 between the first and third nodes includes the in-memory state 36 of each node. The metadata 36 facilitates that the application running on the third pod (pod 3) of the third node (node N) may be run on the third pod (pod 3) of the first node (node 1). In some examples, the application running on pod 3 of the third node (node N) may be replicated on pod 2 for the purposes of scaling up. In other examples, pod 1 may fail. When pod 1 on node 1 fails, the application may be started on pod 1 of node 2.

The example illustrated in FIG. 4 illustrates how the major meta data (majMetadata) is shared between the two pods at the two different nodes. The architecture depicted in FIG. 4 does not include any external storage, such as the storage provided in Kubernetes. Instead memory space is maintained in each node by intelligence that is integrated into the containers, e.g., the start container 26, the application container 31, the replica info container 32 and the customization container 33 within the same pod 25. The major metadata is shared by the nodes.

In the example that is depicted in FIG. 4, the second node (node 2) and the third node (node N) having a second pod (Pod2) that also share metadata 35 including the in-memory state 36 of each node.

Figure 5:
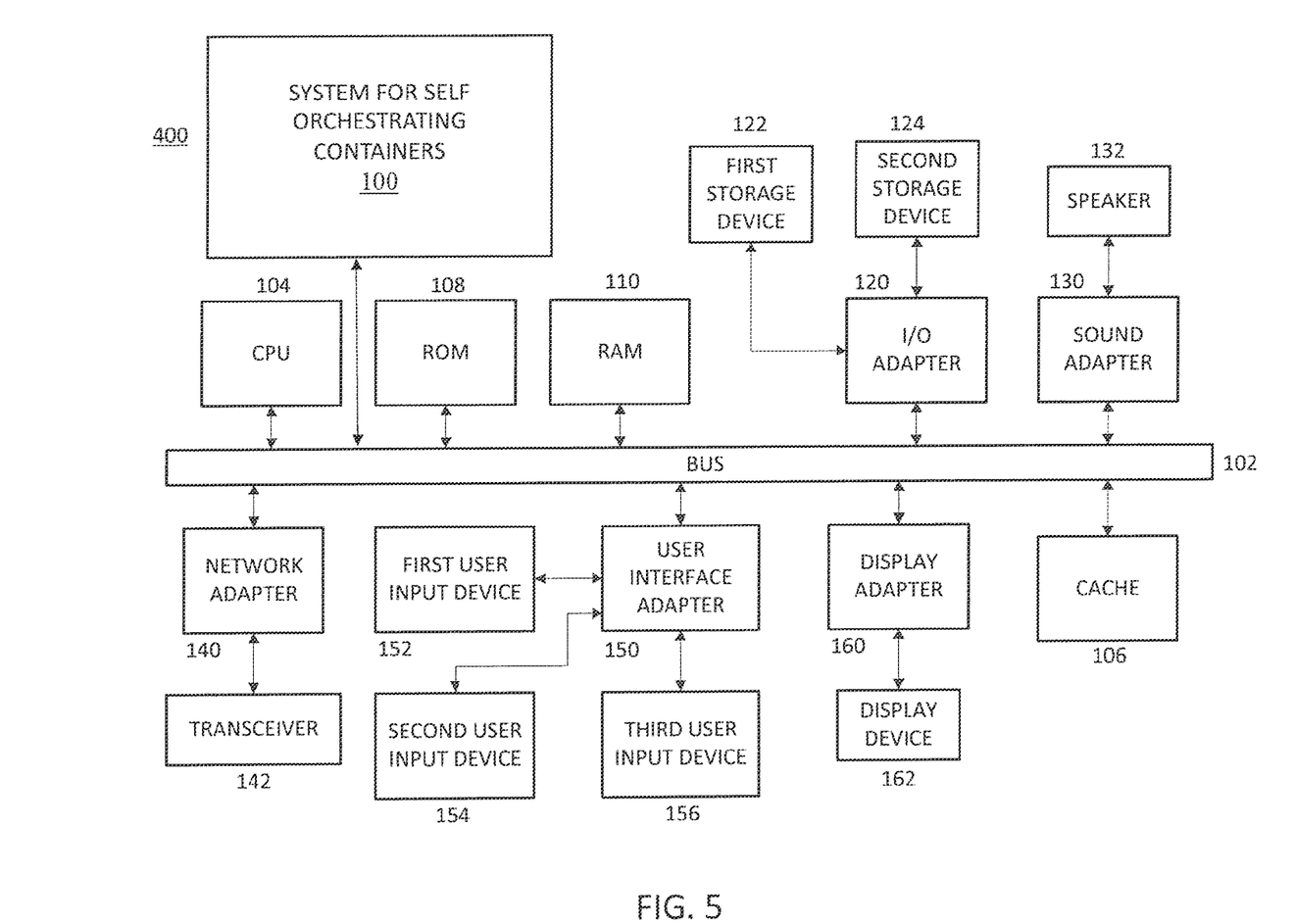
FIG. 5 is a block diagram illustrating a system that can incorporate the self-orchestrating containers that are depicted in FIG. 3, in accordance with one embodiment of the present disclosure.
Figure 6:
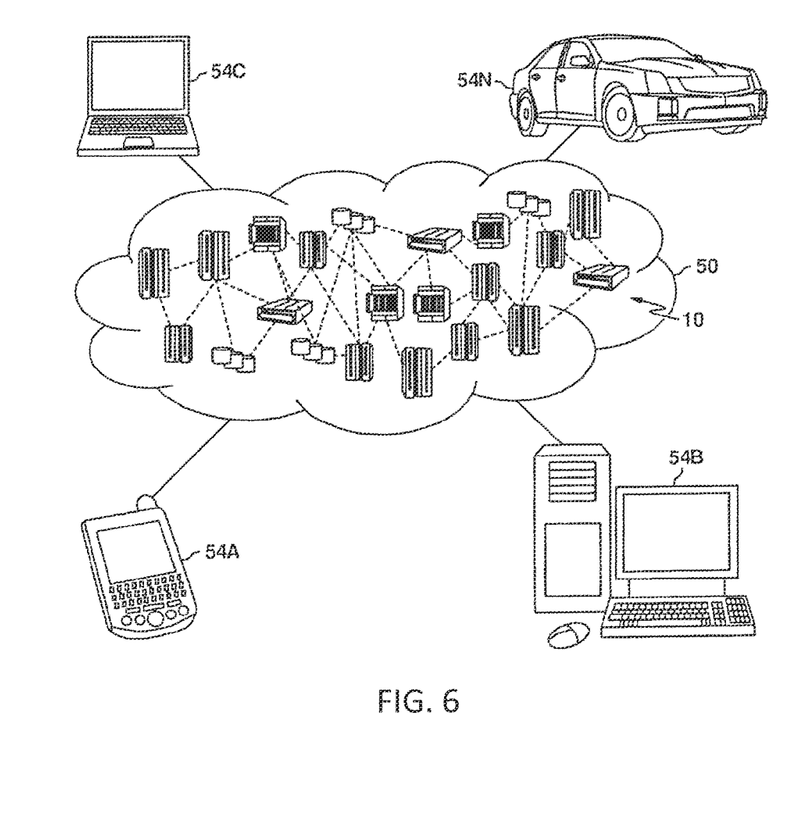
FIG. 6 depicts a cloud computing environment according to an embodiment of the present disclosure.
Figure 7:
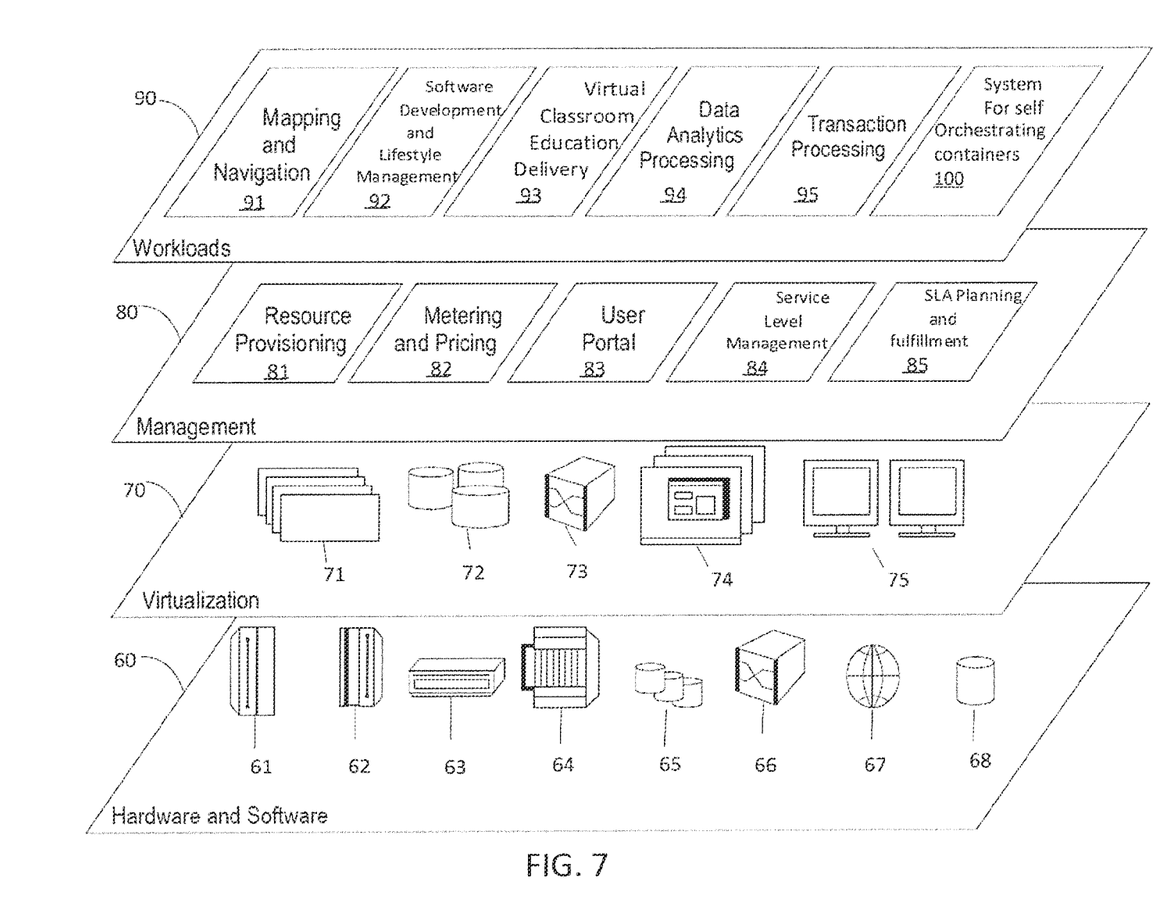
FIG. 7 depicts abstraction model layers according to an embodiment of the present disclosure.

FIG. 5 is a block diagram illustrating a process system 400 that can incorporate the system 100 that provides for self orchestrating containers that is depicted in FIG. 3. FIG. 5 depicts one embodiment of an exemplary processing system 400 to which the present invention may be applied is shown in accordance with one embodiment. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. As illustrated, the system 100 that provides for provenance based identification of policy deviations in cloud environments can be integrated into the processing system 400 by connection to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The present invention may be a system, a method, and/or a computer program product at any possible technical detail level of integration. For example, in some embodiments, a computer program product is provided for self-orchestrating containers for running applications in distributed computer networks. The computer program product includes a computer readable storage medium having computer readable program code embodied therewith. The program instructions executable by a processor to cause the processor to configure, using the processor, a plurality of containers for running applications associated to at least one node of a distributed computing environments, wherein the containers of the plurality of containers includes integrated intelligence that provides an in memory state component that detects how container instances are running. The integrated intelligence can also include a quorum synchronization component that coordinates the activities of the containers. The program instructions can also initiate, using the processor, a first container from the plurality of containers for running a first node application on at least one node of the distributed network. The program instructions can also employ, using the processor, the in memory state component of the integrated intelligence from the plurality of containers to determine a topology existing in the plurality of containers that is running an application matching the first node application at an existing node of the distributed network separate from the node at which the first node application is to be run. The program instructions can also employ the quorum synchronization component of the integrated intelligence from the plurality of the containers to coordinate running of the first node application with the first container with the application running at the existing node of the distributed network.

The computer program product may include a computer readable storage medium (or media) having computer readable program instructions thereon for causing a processor to carry out aspects of the present invention. The computer program produce may also be non-transitory.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for self-orchestrating containers (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for self-orchestrating containers comprising:
configuring a plurality of containers for running applications associated to at least one node of a distributed computing environment, wherein the plurality of containers include integrated intelligence that provides an in memory state component that maintains how container instances of the plurality of containers are running, and a quorum synchronization component that synchronizes activities of the containers;
initiating a first container from the plurality of containers for running a first node application on the at least one node of the distributed computing environment;
employing the in memory state component of the integrated intelligence from the plurality of containers to determine a topology of the plurality of containers that is running an existing application matching the first node application at an existing node of the distributed computing environment separate from the at least one node where the first node application is to be run; and employing the quorum synchronization component of the integrated intelligence from the plurality of the containers to synchronize running of the first node application with the first container with the existing application running at the existing node of the distributed computing environment.

2. The computer-implemented method of claim 1, wherein the distributed computing environment is a cloud computing environment.

3. The computer-implemented method of claim 1, wherein metadata that is shared by the plurality of containers for running applications provides data used by the in memory state component of the integrated intelligence from the plurality of containers to determine the topology of the plurality of containers that is running the existing application matching the first node application at the existing node of the distributed computing environment.

4. The computer-implemented method of claim 1, wherein metadata that is shared by the plurality of containers for running applications provides data used by the quorum synchronization component to synchronize running of the first node application with the existing application running at the existing node.

5. The computer-implemented method of claim 4, wherein the metadata includes an in memory state data for the plurality of containers illustrating whether an application is running active or is dormant.

6. The computer-implemented method of claim 1, wherein state changes of the existing application running at the existing node triggers updates in the in memory state component of the integrated intelligence.

7. The computer-implemented method of claim 1, wherein the plurality of containers that includes integrated intelligence that coordinate running of the first node application without Kubernetes.

8. The computer-implemented method of claim 1, wherein a state of the application running at the existing node of the distributed computing environment is active, and a state of the first node application is dormant.

9. The computer-implemented method of claim 8, further including activating the dormant first node application to scale up.

10. A system for self-orchestrating containers comprising:
a hardware processor; and
a memory that stores a computer program product, which, when executed by the hardware processor, causes the hardware processor to:
configure a plurality of containers for running applications associated to at least one node of a distributed computing environment, wherein the plurality of containers include integrated intelligence that provides an in memory state component that maintains how container instances of the plurality of containers are running, and a quorum synchronization component that synchronizes activities of the containers;
initiate a first container from the plurality of containers for running a first node application on the at least one node of the distributed computing environment;
employ the in memory state component of the integrated intelligence from the plurality of containers to determine a topology of the plurality of containers that is running an existing application matching the first node application at an existing node of the distributed computing environment separate from the at least one node where the first node application is to be run; and employ the quorum synchronization component of the integrated intelligence from the plurality of the containers to synchronize running of the first node application with the first container with the existing application running at the existing node of the distributed computing environment.

11. The system of claim 10, wherein the distributed computing environment is a cloud computing environment.

12. The system of claim 10, wherein metadata that is shared by the containers in the plurality of containers for running applications provides data used by the memory state component of the integrated intelligence from the plurality of containers to determine the topology of the plurality of containers that is running the existing application matching the first node application at the existing node of the distributed computing environment.

13. The system of claim 10, wherein metadata that is shared by the plurality of containers for running applications provides data used by the quorum synchronization component to synchronize running of the first node application with the existing application running at the existing node.

14. The system of claim 13, wherein the metadata includes an in memory state data for the plurality of containers illustrating whether an application is running active or is dormant.

15. The system of claim 10, wherein state changes of the existing application running at the existing node triggers updates in the in memory state component of the integrated intelligence.

16. The system of claim 10, wherein the plurality of containers includes integrated intelligence that coordinate running of the first node application without Kubernetes.

17. The system of claim 10, wherein a state of the existing application running at the existing node of the distributed computing environment is active, and the first node application is dormant.

18. The system of claim 17, further including activating the dormant first node application to scale up.

19. A computer program product for self-orchestrating containers comprising a computer readable storage medium having computer readable program code embodied therewith, the program code executable by a processor to cause the processor to:
configure, using the processor, a plurality of containers for running applications associated to at least one node of a distributed computing environment, wherein the plurality of containers include integrated intelligence that provides an in memory state component that maintains how container instances of the plurality of containers are running, and a quorum synchronization component that synchronizes activities of the containers;
initiate, using the processor, a first container from the plurality of containers for running a first node application on the at least one node of the distributed computing environment;
employ, using the processor, the in memory state component of the integrated intelligence from the plurality of containers to determine a topology of the plurality of containers that is running an existing application matching the first node application at an existing node of the distributed computing environment separate from the at least one node where the first node application is to be run; and
employ the quorum synchronization component of the integrated intelligence from the plurality of the containers to synchronize running of the first node application with the first container with the existing application running at the existing node of the distributed computing environment.

20. The computer program product of claim 19, wherein the distributed computing environment is a cloud computing environment.

* * * * *